RIGHT-OF-WAY TYPE TELEPHONE SYSTEM

Filed Dec. 6, 1956 3 Sheets-Sheet 1

INVENTOR.
WILLIAM W. PHARIS
BY Henry H. Gage
AGENT

United States Patent Office 2,892,894

Patented June 30, 1959

2,892,894

RIGHT-OF-WAY TYPE TELEPHONE SYSTEM

William W. Pharis, Rochester, N.Y., assignor to General Dynamics Corporation, Rochester, N.Y., a corporation of Delaware Application December 6, 1956, Serial No. 626,711

5 Claims. (Cl. 179—18)

My invention relates to telephone systems in general and more particularly to telephone systems in which right-of-way or executive priority connections may be established.

In the past it has been the practice to provide so-called executive right-of-way type switching apparatus in which a connector, accessible from an executive line, can be made to override a busy condition on a called subscriber line in order to reduce the time required for the executive line to reach any station within the system. In some applications, such as a private branch exchange, where connectors have access not only to other private branch exchange stations but to levels in which trunk lines are terminated, it is not always advantageous to allow the executive right-of-way feature to be used on such trunk connections. In certain telephone systems, particularly those made and sold under the trademark "XY," it is advantageous to maintain a continuous multiple to which all connectors, both conventional and right-of-way types, have access in order to retain the inherent flexibility of such systems. For this reason, the most obvious method of defining right-of-way service on trunk lines, namely, disconnecting the multiple on trunk terminating levels in that portion of the multiple reserved for the right-of-way connector, is not always a satisfactory solution to the access limiting problem.

Accordingly, it is an object of my invention to provide new and improved executive right-of-way type telephone apparatus.

Another object of my invention is to provide an executive right-of-way type connector having access to other stations but not to trunk lines within the system.

Another object of my invention is to provide a two-motion, executive right-of-way type connector in which the wiper set may not be advanced within levels reserved for terminating trunk lines.

In the preferred embodiment of my invention, I accomplish these and other objects by providing an executive line and an executive right-of-way type connector individual to that line. The connector includes a well known two-motion type switch having a wiper set and a plurality of terminal sets disposed in a number of levels for engagement by the wiper set. The connector includes means for advancing the wiper set in a primary direction in order to select one of the levels of terminal sets and means for advancing the wiper set within the selected level in order to engage any one of the terminal sets within that level. The connector includes means responsive to successive directive trains of digit impulses transmitted from the station dial on the executive line for directively operating the primary advancing means and thereafter directively operating the secondary advancing means.

The terminal sets in certain ones of the levels are connected to other private branch exchange station lines and conventional line circuits. It is to these lines that right-of-way type connections can be established. The terminal sets in the other levels are reserved for terminating trunk circuits outgoing to and incoming from other offices, such as a community dial office.

According to this invention, level marking means operative in response to a primary advance of the wiper set to any one of the trunk-bearing levels is provided. The level marking means is effective for operating means comprising a relay within the connector for disconnecting the secondary advancing means from the impulsing contacts of the calling bridge relay thereby rendering the secondary advancing means ineffective.

For a better understanding of my invention, reference is made in the following description to the drawings attached to and forming a part of the present specification, and in which:

Fig. 1 shows a subscriber station and a part of an executive right-of-way connector;

Fig. 4 shows the arrangement in which Figs. 1–3 are to be arranged.

Figures 1, 4:
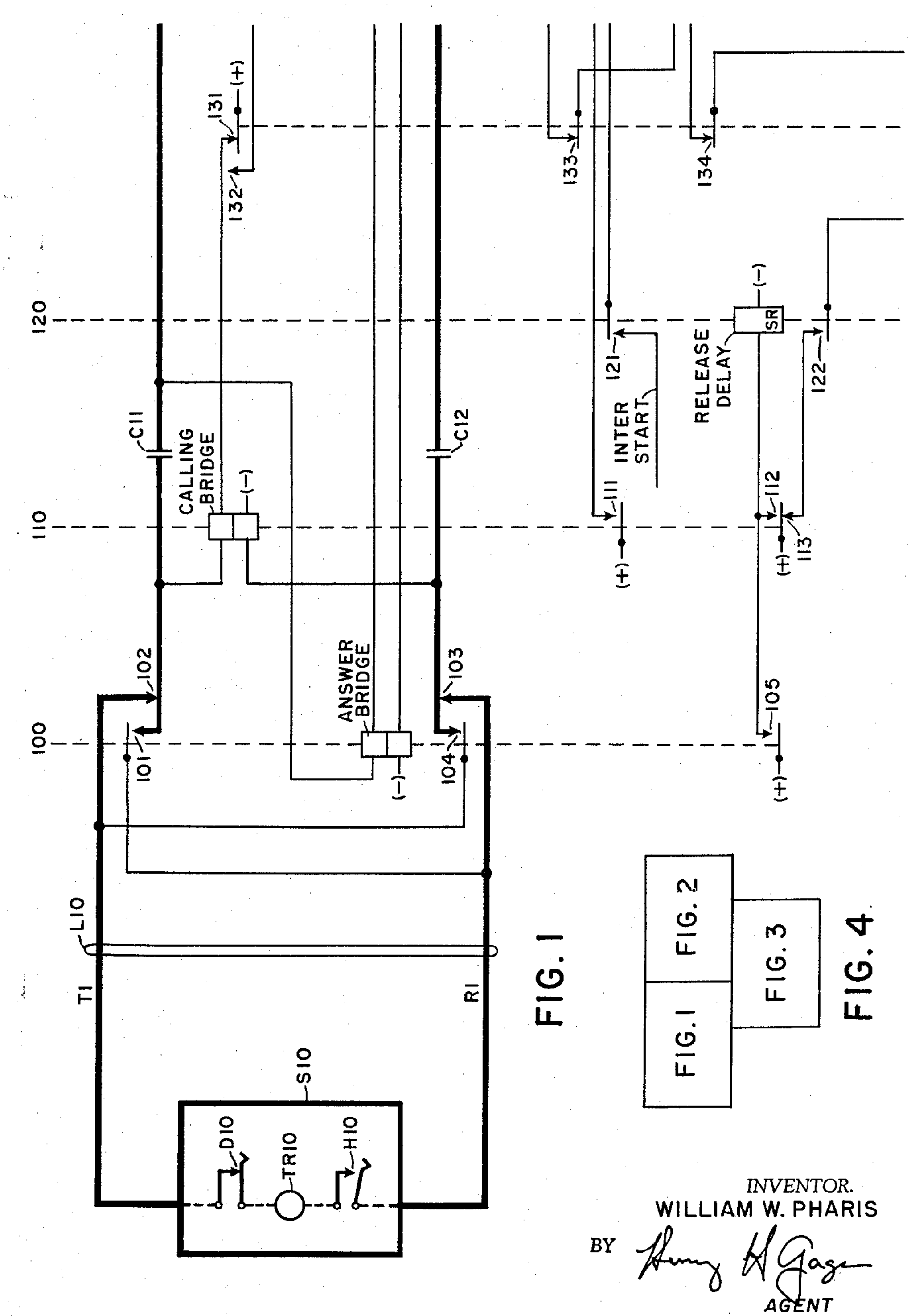

Power for the apparatus described in the following paragraphs is drawn from several sources. The first of these is a battery, the most positive plate or terminal of which is connected to ground and is hereinafter referred to in the description as "ground" and in the drawings as (+); the most negative, ungrounded plate or terminal of which is referred to in the description as "battery" and in the drawings as (−). A second source is the well-known telephone type ringing source which includes a battery, the most positive plate of which is grounded in series with an alternating current generator connected to the ungrounded battery terminal; the grounded side of this combination is referred to in the drawings as (+) and in the description as "ground"; the ungrounded side of the combination is referred to in the description as "generator" and in the drawings as (±). Another power source is the well-known telephone type audio frequency tone generator which is coupled through a low impedance device to ground. This low impedance source is supplied in an uninterrupted form to the apparatus referred to in the drawings and the following description as "dial tone." A lead from the dial tone source, run through the contacts of the well-known interrupter, is used for supplying an interrupted audio frequency signal to the apparatus which is referred to in the drawings and the following paragraphs as "busy tone."

Figure 2:
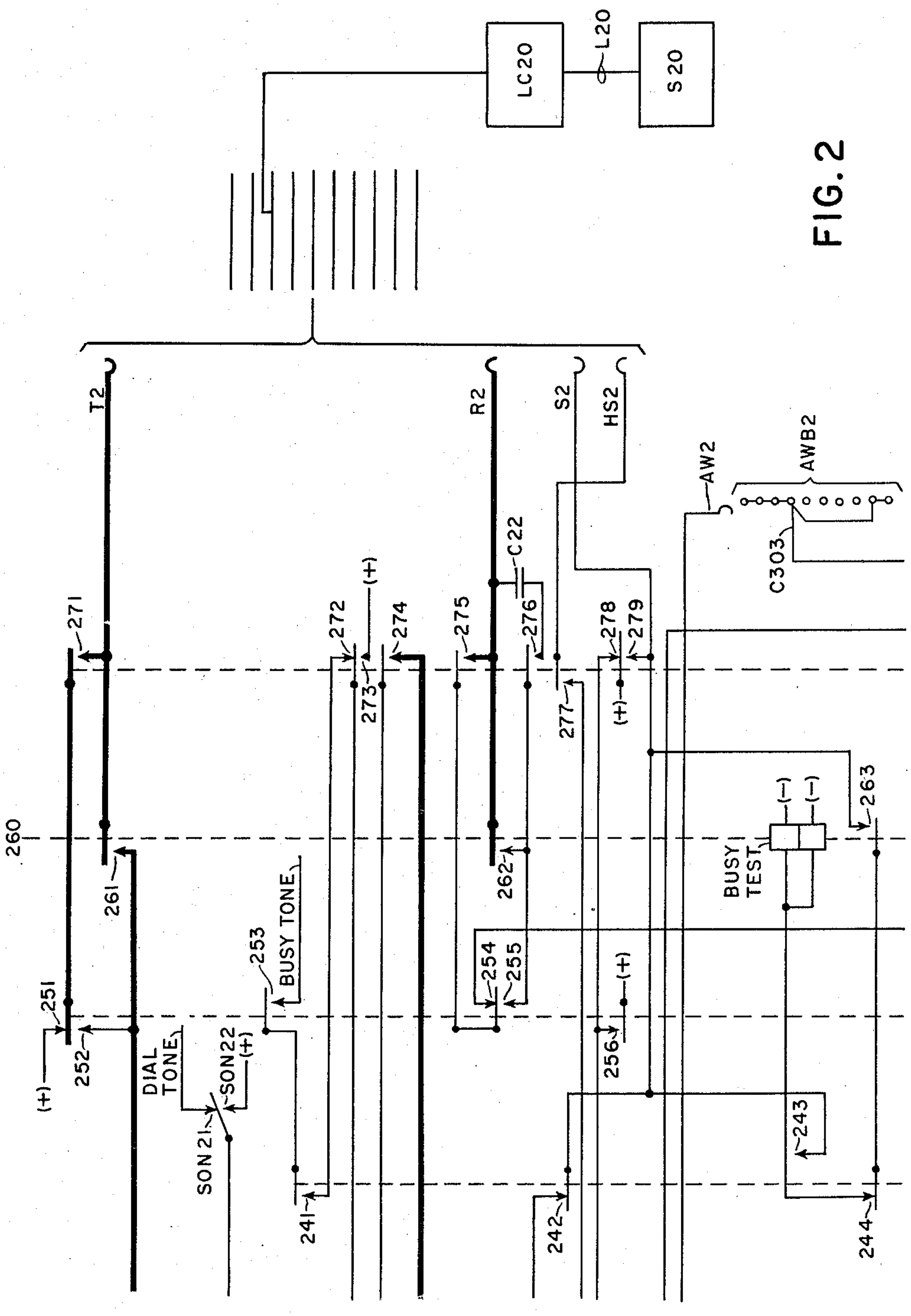
Fig. 2 shows a part of an executive right-of-way connector and a block representation of a connector multiple bank and a subscriber line circuit and station.
Figure 3:
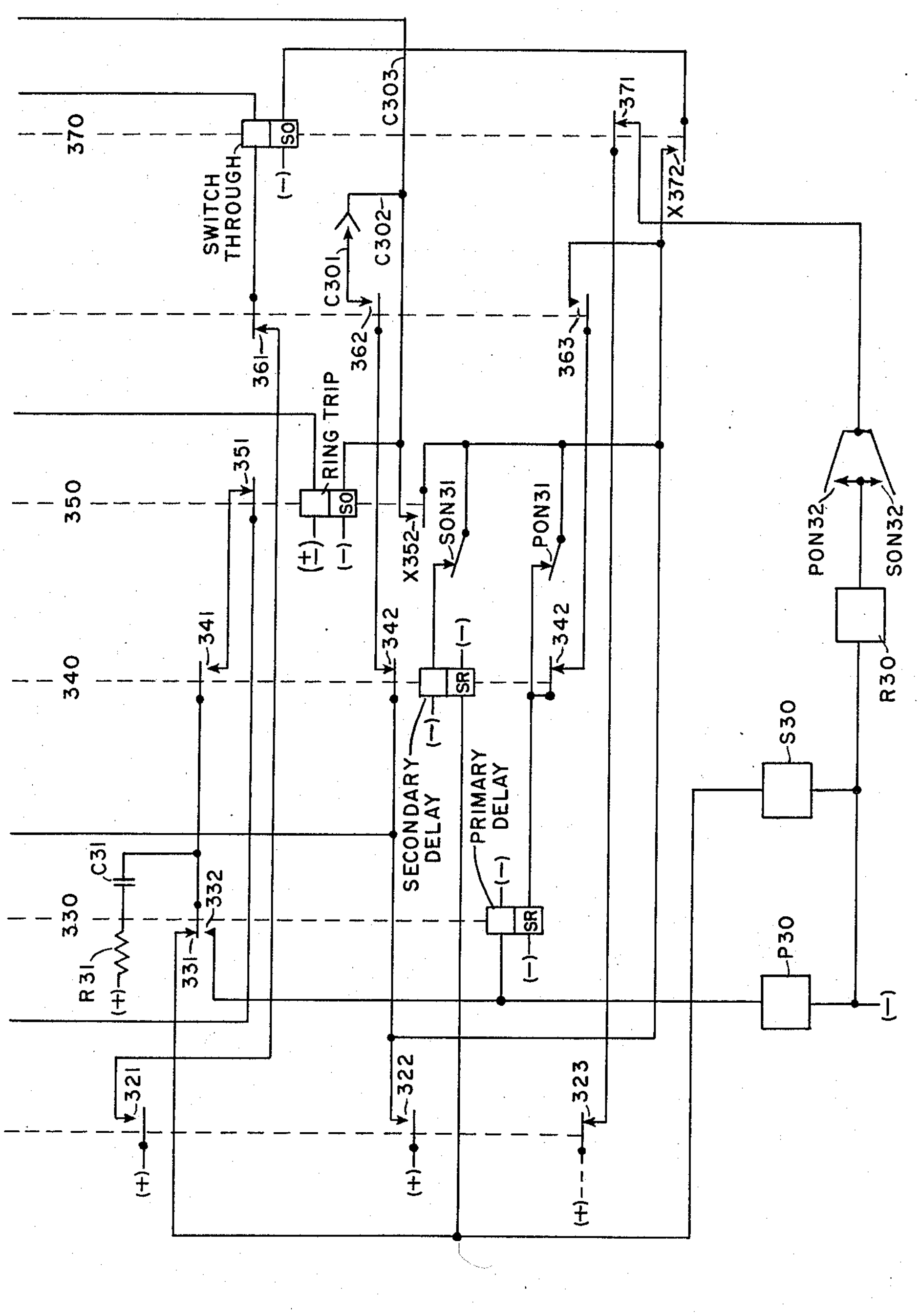
Fig. 3 shows the remainder of an executive right-of-way connector.

The preferred embodiment of my invention is suitable for use in a private dial branch exchange in which a particular executive line, L10, and station, S10, are individually connected to the special connector switch shown in Figs. 1–3. The connector is not used for extending calls from any but line L10. The exchange also includes other apparatus not shown in the drawings and which is of the conventional type, for extending connections between other stations and trunks within the system.

In the contemplated system, station S10 may originate calls through the connector in order to extend monitoring or executive right-of-way connections to any of the aforementioned other stations within the private branch exchange. The manner in which such calls are to be extended is next described.

In order to originate a call, the subscriber at station S10 removes the telephone from its hookswitch in order to complete a short including dial contacts D10 and transmitter TR10 between conductors T1 and R1 of line L10 at hookswitch contacts H10. The completion of the short completes a circuit for operating calling bridge relay 110 which is traced as follows: from ground through break contacts 131, the upper winding of relay 110, break contacts 102, conductor T1, dial D10 and transmitter TR10 within the station, conductor R1, break contacts 103, and the lower winding of relay 110 to battery. Relay 110 thereupon operates and is thereafter responsive to both hookswitch and dial signals transmitted from station S10.

The operation of relay 110 is effective for closing an obvious operating circuit for release delay relay 120 at make contacts 112. Relay 120 thereupon operates. The operation of relay 110 is further effective for preparing a circuit for applying ground to wiper HS2 at make contacts 111.

The operation of relay 120 is effective for closing operating circuits for primary delay relay 330 and secondary delay relay 340. In the case of relay 330 the circuit is traced from battery through the lower winding of relay 330, break contacts PON31 and make contacts 322 to ground. In the case of relay 340 the circuit is traced from battery through the upper winding of relay 340, secondary off-normal contacts SON31, and make contacts 322 to ground. The operation of relay 120 is further effective for preparing an impulsing circuit for operating primary magnet P30 and secondary magnet S30 to make contacts 122. The operation of relay 120 is further effective for preparing an operating circuit for switch-through relay 370 at make contacts 321. The operation of relay 120 is further effective for opening the operating circuit of release magnet R30 at break contacts 323.

The operation of relay 330 is effective for disconnecting the above-described ground source for the operating circuit for relay 110 at break contacts 131 and for replacing the ground source with the low impedance dial tone source through secondary off-normal break contacts SON21 and make contacts 132. The operation of relay 330 is further effective for opening the operating circuit from relay 370 at break contacts 133, for opening the circuit for energizing auxiliary wiper AW2 at break contacts 134, and for preparing a circuit to energize magnet P30 and to hold relay 330 in its operated condition at make contacts 332.

The operation of relay 340 is effective for preparing a circuit for applying busy tone to the above-described loop of the executive line at make contacts 241. The operation of relay 340 is further effective for disconnecting sleeve wiper S2 from the operating circuit of relay 370 at break contacts 242. The operation of relay 340 is further effective for connecting sleeve wiper S2 to the winding of busy test relay over the following circuit: from wiper S2 through make contacts 243 and the windings of relay 260 to battery. The operation of relay 340 is further effective for opening a holding circuit of relay 260 at break contacts 244. The operation of relay 340 is further effective for preparing energizing circuits for magnets P30 and S30 at make contacts 341, and for disconnecting conductor C301 from ground supplied to the latter through make contacts 322 at break contacts 342. The operation of relay 340 is further effective for opening an alternate ground supply for the lower winding of relay 320 at break contacts 343.

The above-described connection of dial tone to station S10 indicates to the user of the station that the connector is in condition to receive trains of directive dial impulses from the station dial. Thereupon the station dial is operated to cause dial contacts D10 to be opened and reclosed in a series of operations corresponding in number to the number of impulses in the transmitted train. The repeated opening and closing of the above-described operating circuit of relay 110 at contacts D10 causes relay 110 to release and reoperate a corresponding number of times. At the conclusion of the transmission of any train of impulses, relay 110 comes to rest in its operated condition. It is to be noted that relay 120, being a slow release type, remains operated during the impulsing operation of relay 110 even though the operating circuit of relay 120 is momentarily opened at make contacts 112 throughout the transmission of an impulse train.

During the transmission of a first impulse train from the dial at station S10, each release of relay 110 is effective for closing the operating circuit of magnet P30. Thus, magnet P30 is energized and de-energized once for each impulse in the received first train. The circuit for energizing magnet P30 is traced from battery through the winding of magnet P30, make contacts 332 and 341, break contacts 351, make contacts 122 and break contacts 113 to ground.

Each energization of magnet P30 is effective for advancing the connector's main wipers set including wipers T2, R2, S2 and HS2 one step in its primary direction away from normal position. In this manner the wiper set is advanced in the primary direction to a point adjacent to one of the plurality of levels in which sets of terminals are disposed. Each energization of magnet P30 is also effective for advancing auxiliary wiper AW2 one step away from its normal position and into engagement with the one of the terminals in auxiliary wiper bank AWB2 corresponding to the level chosen by the main wiper set.

The advance in the main and auxiliary wiper sets away from their normal positions is further effective for operating the primary off-normal means associated with the switch. Thus the primary advance of the switch is effective for opening the previously described circuit for energizing the lower winding of relay 330 at primary off-normal break contacts PON31. Similarly, the advance of the switch in its primary direction is effective for preparing an operating circuit for magnet R30 at primary off-normal make contacts PON32.

During the time that magnet P30 is being energized over the above-traced circuit, an obvious branch in parallel magnet P30 is energized for energizing the upper winding of relay 330. Relay 330 is a slow release type. Therefore, the intermittent energization of its upper winding is effective for maintaining relay 330 in its operated condition even though the above-described operating circuit including the lower winding of relay 330 is opened at contacts PON31. At the conclusion of the transmission of the first impulse train, when relay 110 comes to rest in its operated condition, the above-described holding circuit including the upper winding of relay 330 is open at break contacts 113 for a period of time sufficient to allow relay 330 to release.

The release of relay 330 re-establishes the above-described ground connection to line L10 at break contacts 131 and disconnects dial tone from line L10 at make contacts 132. The release of relay 330 is effective for preparing the operating circuit of relay 370 at break contacts 133. The release of relay 330 is effective for energizing wiper AW2 over the following circuit: from ground through make contacts 322 and break contacts 134 to wiper AW2. The effect of energizing wiper AW2 is to be explained presently. The release of relay 330 is further effective for opening the above-described energizing circuit of magnet P30 and the upper winding of relay 330 at make contacts 332, and for preparing an energizing circuit for magnet S30 at break contacts 331. The connector is now in condition to receive a second impulse train from station S10.

During the transmission of the second train of impulses from the dial at station S10, relay 110 is again made to carry out the above-described impulse repeating operation. During each release of relay 110, a circuit is completed in response to the operation of relay 340 and the release of relay 330 for energizing secondary magnet S30. The latter circuit is traced from battery through magnet S30, break contacts 331, make contacts 341, break contacts 351, make contacts 122, and break contacts 113 to ground. The lower winding of relay 340 is in parallel with magnet S30, so that the intermittent energization of that winding during the transmission of the second impulse train is effective to hold relay 330 in operated condition even though the above-described operating circuit including the upper winding is opened in the manner to be described presently.

Each energization of magnet S30 is effective for advancing the main wiper set one step within the selected level of terminal sets. Thus, at the conclusion of a transmission of the second impulse train, the wiper set comes to rest in engagement with a terminal set connected to the line and station, such as L20 and S20, respectively, to which the calling station S10 wishes to establish a connection. The advance of the main wiper set in the secondary direction is also effective for operating secondary off-normal means including break contacts SON31. The operation of break contacts SON31 is effective for opening the above-described energizing circuit for the upper winding of relay 340. At the conclusion of the transmission of the second impulse train, when relay 110 comes to rest in its operated condition, the energizing circuit for magnet S30 and for holding relay 340 operated is opened at break contacts 113. Because both the holding circuit and operating circuit of relay 340 are opened, relay 340 is prepared to release at this time. Relay 340 is a slow release type, and therefore remains operated for a time interval sufficient for apparatus to be described presently to conduct a test to determine the idle or busy condition of the called line. The operation of secondary off-normal springs is also effective for disconnecting the above-described dial tone source from the prepared connection to the upper winding of relay 110 at break contacts SON31 and for substituting direct ground for the dial tone ground at make contacts SON22. Thereafter the reoperation of relay 330 is ineffective to reconnect dial tone to the loop of the calling line L10.

Prior to the release of slow type relay 340, a connection is completed between the well known sleeve terminal of the set engaged by the main wiper set and the winding of busy test relay 260. The circuit is traced from the terminal (not shown) through wiper S2 and make contacts 243, and the winding of relay 260 to battery. In the event that the called line is in busy condition, ground is present on the sleeve terminal, in keeping with common telephone practice. Thereupon a circuit is completed for energizing relay 260 with effects which are to be explained presently. Similarly, the idle condition of the called line results in the presence of resistance battery on the same terminal, so that relay 260 is not operated at this time. After the above-described busy test has been completed, relay 340 is released, disconnecting the busy tone source from the prepared connection to the calling line at make contacts 241.

Assuming that the called line is idle so that relay 260 remains unoperated, the release of relay 340 is effective for completing a circuit for operating switchthrough relay 370 to the point where preliminary make contacts X372 close. The operating circuit is traced from ground through make contacts 321, break contacts 361, the upper winding of relay 370, break contacts 133 and 242, and wiper S2 to the above referred to resistance battery connected to the engaged terminal. The operation of relay 370 is more fully described in the following paragraphs. The release of relay 340 is further effective for disconnecting the winding of relay 260 from the above-described operating circuit at make contacts 243. The release of relay 340 is further effective for disconnecting the impulsing contacts 113 from the windings of magnets P30 and S30 at make contacts 341. The release of relay 340 is further effective for preparing a circuit for energizing conductors C301 at break contacts 342, and a circuit for energizing the lower winding of relay 330 at break contacts 343.

Returning to the consideration of relay 370, the operation of relay 370 to the point where preliminary make contacts X372 are closed completes a circuit for fully operating relay 370. The latter circuit is traced from ground through make contacts 322 and 372 and the lower winding of relay 370 to battery. The full operation of relay 372 is effective for completing a circuit for connecting generator to the conventional ringer (not shown) at called station S20. The circuit is traced from generator through the upper winding of ring trip relay 350, break contacts 254, make contacts 275, wiper R2, thence to the corresponding conductor of line L20, the station S20 ringer, the other conductor of line L20, wiper T2, make contacts 271 and break contacts 251 to ground. The operation of relay 370 is further effective for applying ground to the lower winding of answering bridge relay 100 at make contacts 273 and for connecting the lower, battery connected winding of relay 100 to the ring side of the connector talking path at make contacts 274. The operation of relay 370 is further effective for completing a reverting ring tone circuit by coupling the generator connected wiper R2 to the incoming loop of the calling line L20 from wiper R through capacitor C22, make contacts 276, capacitor C12, the loop of the line L20, and the upper winding of relay 110 and break contacts 131 to ground. The operation of relay 370 is further effective for completing the connection between ground and wiper HS2 which is traced from ground through make contacts 111 and 277 to wiper HS2. Accordingly, the terminal of the set engaged by wiper HS2 is grounded at this time. The operation of relay 370 is further effective for applying direct ground to wiper S2 at make contacts 279 so that the well known cutoff relay in line circuit LC20 is operated at this time. The operation of relay 370 is further effective for opening the energizing circuit for magnet R30 at break contacts 371.

The signaling of called station S20 continues until the telephone at that station is removed from its hookswitch. At that time, a short is completed in the well known manner between the conductors of line L20 which are connected to the terminals engaged by wipers T2 and R2. Thereupon, direct current from the generator flows through the upper winding of relay 350, break contacts 254, make contacts 275, wiper R2, the loop of line L20, through wiper T2, make contacts 271 and break contacts 251 to ground. Thereupon, relay 350 operates to the point where preliminary contacts X352 make. The closing of contacts X352 is effective for completing a circuit for fully operating relay 350. The latter circuit is traced from ground through make contacts 322 and X352 and the lower winding of relay 350 to battery.

The full operation of relay 350 is effective for disconnecting the above-described ringing generator and ground connections to the called line L20 at break contacts 254 and 251, respectively, and for interconnecting calling line L10 and called line L20 and their stations at make contacts 252 and 255. The interconnecting circuit is traced, on the tip side, from conductor T1 through break contacts 102, capacitor C11, make contacts 252 and 271, wiper T2, the tip terminal of the set engaged by the main wiper, and the tip conductor of the called line connected thereto. The ring side of the interconnecting circuit is traced from conductor R1 through break contacts 103, capacitor C12, make contacts 255 and 275, wiper R2, the ring terminal of the set engaged by the main wiper set, and the ring conductor of the called line connected thereto. The operation of relay 350 is also effective for energizing the telephone at called station S20 by connecting battery and ground through the windings of answering bridge relay 100 to the called line conductors and the telephone at station S20. The latter connection is traced from ground through now operated make contacts 273, the upper finding of relay 100, make contacts 252 and 271, wiper T2, the terminals and loop of the called line including the station telephone, wiper R2, make contacts 275, 255 and 274, and the lower winding of relay 100 to battery. Current flowing through the windings of relay 100 thereupon operates relay 100.

The operation of relay 100 is effective for reversing the direction of current flow over calling line L10 at the sets of reversing contacts on relay 100 including transfer contacts 101—102 and 103—104. The operation of relay 100 is further effective for supplying an additional ground to the winding of relay 120 so that relay 120 is held operated under the control of either the calling line at relay 110 or the called line at relay 100.

Returning to the consideration of operated relay 350, the operation of relay 350 is further effective for preparing a connection for busy tone at make contacts 253 and for disconnecting one of the ground connections at interrupter start conductor 256. The operation of relay 350 is further effective for disconnecting the impulsing contacts of relay 110 from the above-described connection to magnets P30 and S30 at break contacts 351, so that the transmission of impulse trains to the connector subsequent to the operation of relay 350 is without effect on either the primary advancing means including magnet P30 or the secondary advancing means including magnet S30.

The connection between the calling executive station and the called private branch exchange station has now been completed so that the conversation may continue between calling and called lines until both calling and called parties hang up. Upon hang up, the connector is released in the manner to be described presently in order to disconnect the calling and called lines.

Thus far the description has dealt with the extension of a call from the executive line to an idle called line. The method by which the connector overcomes a busy condition in order to interconnect the calling line with a busy called line is next described. In the following description, it is assumed that the stations of the private branch exchange are conventional and that a busy condition on a called line, such as L20, is indicated to the connector by the presence of ground on the sleeve terminal of the set which is engaged by wiper S2 after the main wiper set has been advanced in the above-described manner into engagement with the terminal set individual to the called line.

Returning to that point in the previous description where the second train of impulses has been fully transmitted but where secondary delay relay 340 is still in an operated condition, the engagement of the required terminal set by the main wiper set completes a cricuit for detecting the presence of busy indicating ground on the terminal engaged by wiper S2 by completing an operating circuit for relay 260. The latter circuit is traced from wiper S2 through make contacts 243 and the windings of relay 260 to battery. When ground is present on wiper S2 under these conditions, relay 260 operates. Relay 340 thereafter releases in the above-described manner. The operation of relay 260 and the release of relay 340 is effective for completing a locking circuit for relay 260 which is traced from ground on wiper S2 through make contacts 263, break contacts 244 and the windings of relay 260 to battery. Thus, relay 260 continues to be held in its operated condition so long as the busy indicating ground is present on wiper S2.

The operation of relay 260 is effective for reoperating relay 330 over a circuit traced from battery through the lower winding of relay 330, break contacts 343, and make contacts 363 and 322 to ground. The operation of relay 260 is effective in response to the release of relay 340 for connecting ground to conductor C301 with effects that are to be explained presently; the circuit is traced from ground through make contacts 322, break contacts 342, and make contacts 362 to conductor C301. The operation of relay 260 is further effective for opening the above-traced energizing circuit for the upper winding of relay 370 at break contacts 361 in order to prevent the above-described operation of switchthrough relay 370 and the subsequent connection of generator to the called line at this time.

The operation of relay 260 is further effective for connecting the calling and called lines by completing a talking channel which is traced on the tip side from conductor T1 through break contacts 102, capacitor C11, and make contacts 261 to the tip wiper T2; on the ring side the circuit is traced from conductor R1 through break contacts 103, capacitor C12, and make contacts 262 to wiper R2. It is pointed out that the failure of relay 370 to operate at this time prevents the previously described connection of the battery and ground through the windings of relay 110 to the called line.

Assuming that conductor C301 is not connected through the indicated alternate wiring to conductor C302, the connector is now in monitoring condition and will so remain until the called line becomes idle. When the called line becomes idle, the busy indicating ground is removed from wiper S2. At this time, the connector may be arranged to start the signaling operation of the called station in the manner described next.

Upon the removal of the busy indicating ground from the called line circuit LC20 and the resulting removal of ground from wiper S2, the above-traced holding circuit for relay 260 is opened, so that relay 260 releases. The release of relay 260 is effective for opening the above-traced talking channel through the connector at contacts 261 and 262 and for re-establishing, at break contacts 361, the above-traced operating circuit for the upper winding of relay 370. Relay 370 thereupon operates in the previously described manner in order to render the signaling circuit effective. The release of relay 260 is further effective for opening the above-traced alternate operating circuit for the lower winding of relay 330 at make contacts 363. Relay 330 thereupon releases. Thereafter the signaling operation continues in the previously described manner until the called station S20 telephone is removed from its hookswitch. At that point, relay 350 operates with the previously described effect of disconnecting the signaling circuit from the called station line and completing a talking circuit from the calling executive line to the called station line. Similarly, the previously described connection of the battery and ground supply including the windings of relay 100 is recompleted for the called station telephone by the operation of relay 350. Thereafter the connection goes through to the completion which ends with the release of the connector in the manner to be described presently.

In the event it is desired to prevent the signaling of the called station telephone upon the removal of the busy condition after the previously described monitoring connection has been completed, alternate wiring conductors C301 and C302 are connected as indicated in Fig. 3. With this arrangement, upon the engagement of a set of busy terminals by the main wiper set after the release of relay 340 and upon the operation of relay 260, a circuit is completed for immediately operating ring trip relay 350. This circuit is traced from battery through the lower winding of relay 350, conductors C302 and C301, make contacts 362, break contacts 342, and make contacts 322 to ground. The operation of relay 350 prior to the above-described release of relay 260 arranged the connector so that, upon the removal of the busy condition from the called line L20 and the resulting operation of relay 370, the talking connection between the calling executive line and the called station is immediately established.

As previously pointed out, certain of the levels to which the main wiper set has access are to be restricted with respect to the executive right-of-way connector because the terminal sets within those levels are reserved for trunk circuits to which executive right-of-way connections are denied. Such trunk levels are indicated by the connection of conductor C303 to the corresponding ones of the level indicating terminals within auxiliary wiper bank AWB2. Thus, when a trunk level is selected by the primary movement of the main wiper set, the level selection indicating means including wiper AW2 and an appropriate one of the terminals in bank AWB2 energize (i.e., connect ground to) conductor C303 after relay 330 has released at the conclusion of the primary movement of the main wiper set. The energizing circuit is traced from ground through make contacts 322, break contacts 134, wiper AW2 and the selected terminal in bank AWB2 to conductor C303. The connection of ground to conductor C303 completes an obvious energizing circuit for the lower winding of relay 350. Relay 350 thereupon operates.

The operation of relay 350 is effective in the previously described manner for disconnecting the impulsing contacts 113 on calling bridge relay 110 from the circuits for energizing magnets P30 and S20 at break contacts 351. Thus, following the advance of the main wiper set to a trunk level, the transmission of a subsequent digit impulse train from the calling executive station to the connector has no effect upon the secondary magnet S30 and the main wiper set is not advanced within the selected, restricted level. In order to inform the calling executive station that the selected level is blocked, busy tone is applied to the calling line. Thus the above-described operation of ring trip relay 350 is effective in response to the operation of secondary delay relay 340 for connecting the busy tone source to the calling line. The circuit is traced from the busy tone source through make contacts 253 and 241, break contacts 272, the upper winding of relay 100, capacitor C11, break contacts 102, conductor T1, through the calling station S10, conductor R1, break contacts 103, and the lower winding of relay 110 to battery and thence to ground. The connector remains in this condition until it is released upon the hanging up of the telephone at the calling executive station.

At any point during the extension of the above-described connections through the connector, the connector may be released by releasing relay 120. It is pointed out that until the called party answers and relay 100 is operated, relay 120 is held operated under the sole control of relay 110 which in turn is controlled from the calling station. After the called party has answered, both calling and called station telephones must be hung up in order to release relays 100 and 110 and thereby cause the release of relay 120. Assuming that relay 120 has been restored to its normal condition in order to indicate a hang up, and that the call has progressed to the point where relays 350 and 370 have operated and relays 330 and 340 have released, upon the release of relay 120 the above-described second step operating circuits for relays 350 and 370 are opened by the removal of ground at make contacts 322. Relays 350 and 370 thereupon release.

The release of relays 120 and 370 is effective in response to the operation of either or both the primary and secondary off-normal means for closing a circuit for energizing release magnet R30. The latter is traced from battery through magnet R30, either or both parallel make contacts PON32 and SON32, and break contacts 371 and 323 to ground. The energization of magnet R30 is effective for restoring the main wiper set and auxiliary wiper AW2 to their normal positions. The restoration of the wiper sets to normal position is effective for restoring the off-normal means including the primary and secondary off-normal springs to their normal condition. Thereupon the connector is in condition to originate another call.

In the event that a call has been extended through the presently described connector to a busy called line and progressed to the point where relay 260 is in its operated condition, the release of the connection by hanging up the calling executive telephone is effected upon the release of relays 110 and 120 and thereby energizing magnet R30 over the above-traced circuit which includes primary off-normal means PON32. The restoration of the wiper switch from an advanced primary position is effective for removing ground from sleeve wiper S2 thereby opening the above-traced locking circuit for relay 260 which thereafter releases. The restoration of relay 120 to its normal condition also opens the above-traced locking circuit including the upper winding of relay 340 at make contacts 322. Thus the connector is restored to normal condition in the event that relay 120 is released before the main wiper set has been advanced in its secondary direction, as in the case of release following the selection of a trunk level.

I have described in the foregoing paragraphs an executive right-of-way type connector capable of preventing the extension of right-of-way type connections to trunk lines terminated within any one of a number of particular levels. Thus I have shown how, upon the energization of level marking means individual to trunk levels, the conventional ring trip relay is also employed for disconnecting the impulsing contacts of the calling bridge relay from the circuit for energizing the secondary direction advancing magnet. Similarly, I have shown how the operation of the ring trip relay is effective under these conditions for applying a distinctive tone to the calling line and station in order to inform the user that the call has been blocked.

While I have shown and described the preferred embodiment of my invention, other modifications will readily occur to those skilled in the telephone art. I, therefore, aim to cover in the appended claims all such modifications that fall within the spirit and scope of my invention.

What I claim is:

1. In a telephone system, a calling line, a connector including a switch, means for extending a connection from said line to said connector, said switch including a wiper set and a plurality of levels of sets of terminals disposed for engagement by said wiper set, means for advancing said wiper set in a primary direction to select one of said levels, means for advancing said wiper set in a secondary direction within the selected one of said levels to select one of said terminal sets, means for directively operating said primary advancing means and thereafter said secondary advancing means, means operative in response to the selection of certain ones of said levels for rendering said directively operating means ineffective with respect to said secondary advancing means, a tone source, and means including said level responsive means for connecting said tone source to said line, whereby a distinctive tone connected to said calling line appraises the user of a telephone connected to said line that a connection through said switch has been blocked.

2. In a telephone system, a connector including a switch, said switch having a wiper set and a plurality of levels of sets of terminals disposed for engagement by said wiper set, apparatus connected to said terminal sets within certain of said levels, means including said wiper set for extending a connection from said connector to one of said terminal sets, means for advancing said wiper set in a primary direction to select one of said levels, means for advancing said wiper set in a secondary direction within the selected one of said levels in order to select an individual one of said terminal sets, means for directively controlling said primary advancing means and for thereafter directively controlling said secondary advancing means, a source of signaling voltage, means for connecting said source to the selected one of said terminal sets, means operative in response to the transmission of a supervisory signal from said apparatus connected to the selected one of said terminal sets for disconnecting said source from the selected one of said terminal sets, said signal responsive means also being operative in response to the selection of any one of said levels other than said certain levels and effective for rendering said directively operating means ineffective with respect to said secondary advancing means, whereby the extension of connections from said connector to any one of said terminal sets within the other of said levels is prevented.

3. The system set forth in claim 2 and also including a calling line, means for extending a connection from said line to said connector, a tone source, and means including said signal responsive means for connecting said tone source to said line, whereby a distinctive tone connected to said line appraises the user of a telephone connected to said line that a connection has been blocked.

4. In a telephone system, a connector including a switch, said switch having a set of wipers and a plurality of levels of sets of terminals disposed for engagement by said wiper set, apparatus connected to said terminal sets within certain of said levels, means including said wiper set for extending a connection from said connector to one of said terminal sets, means for advancing said wiper set in a primary direction to select one of said levels, means for advancing said wiper set in a secondary direction within the selected one of said levels in order to select an individual one of said terminal sets, means for seizing said connector, primary delay means responsive to the operation of said seizing means for preparing said primary advancing means for operation, secondary delay means responsive to the operation of said seizing means for preparing said secondary advancing means for operation, impulsing means effective in response to the operation of said primary delay means for directively controlling said primary advancing means and thereafter operative in response to the operation of said secondary delay means for directively controlling said secondary advancing means, a source of signaling voltage, switchthrough means operative in response to the selection of one of said terminal sets for connecting said source to the selected one of said terminal sets, means operative in response to the primary advance of said wiper set for releasing said primary delay means, means operative in response to the secondary advance of said wiper set for releasing said secondary delay means, means operative in response to the operation of said switchthrough means and the transmission of a supervisory signal from said apparatus connected to the selected one of said terminal sets for disconnecting said source from the selected one of said terminal sets, said signal responsive means also being operative in response to the selection of any one of said levels other than said certain levels and to the release of said primary delay means for rendering said directively operating means ineffective with respect to said secondary advancing means, whereby the extension of a connection from said connector to any one of said terminal sets within the other of said levels is prevented.

5. The system set forth in claim 4 and also including a calling line, means for extending a connection from said line to said connector, a tone source, and means including said signal responsive means operative in response to the operation of said secondary delay means for connecting said tone source to said line, whereby a distinctive tone connected to said line appraises the user of a telephone to said line that a connection has been blocked.

References Cited in the file of this patent

UNITED STATES PATENTS

| | | |
|---|---|---|
| 1,542,383 | Hague | June 16, 1925 |
| 2,333,038 | Voss | Oct. 26, 1947 |
| 2,490,221 | Lomax | Dec. 6, 1949 |
| 2,707,727 | Pharis | May 3, 1955 |
| 2,791,635 | Bakker | May 7, 1957 |